INVENTORS.
THEODORE F. VAIDA
GEORGE J. VAIDA
BY
Kenyon & Kenyon
ATTORNEYS.

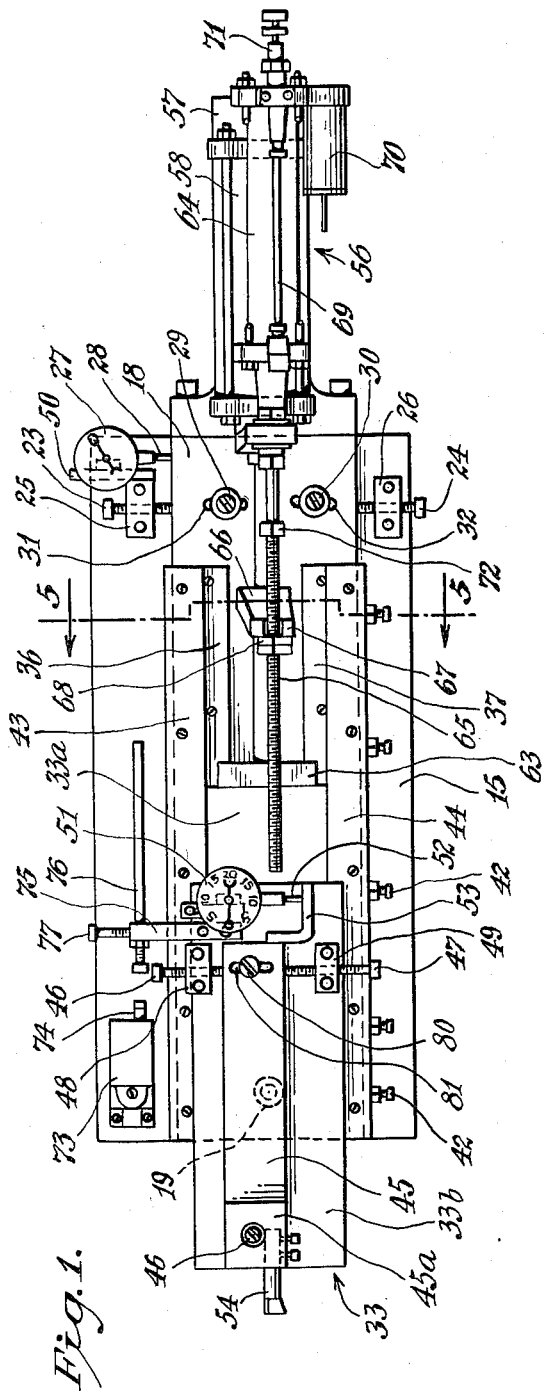
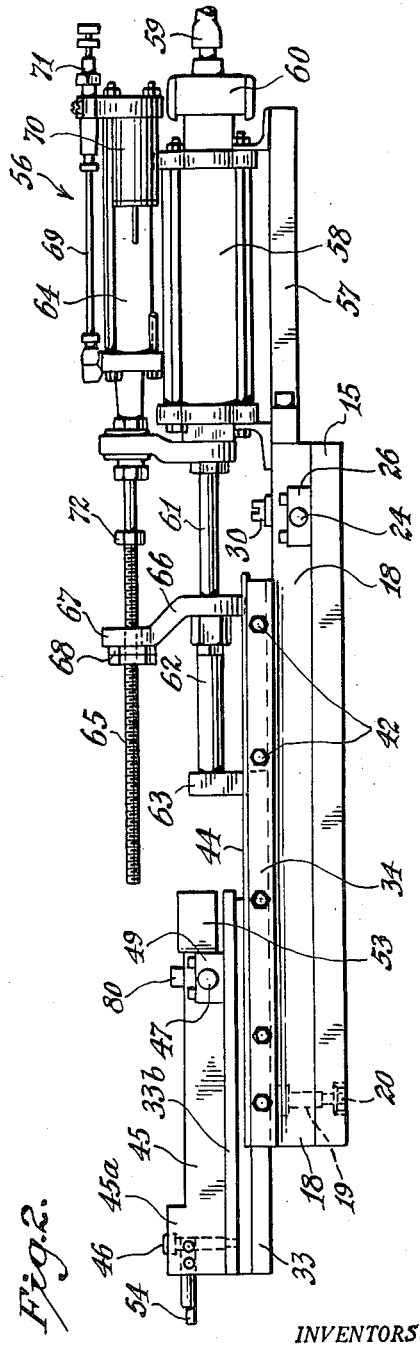

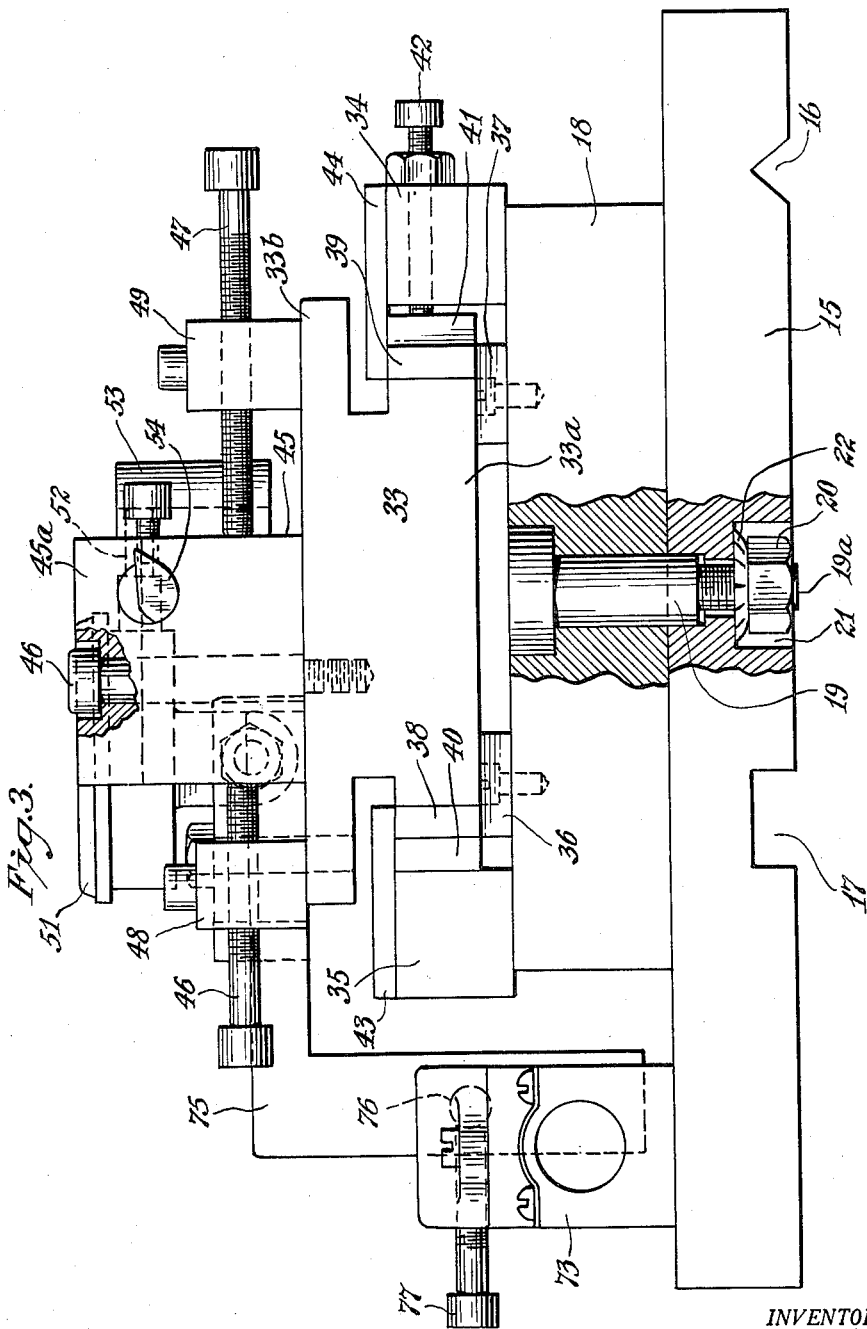

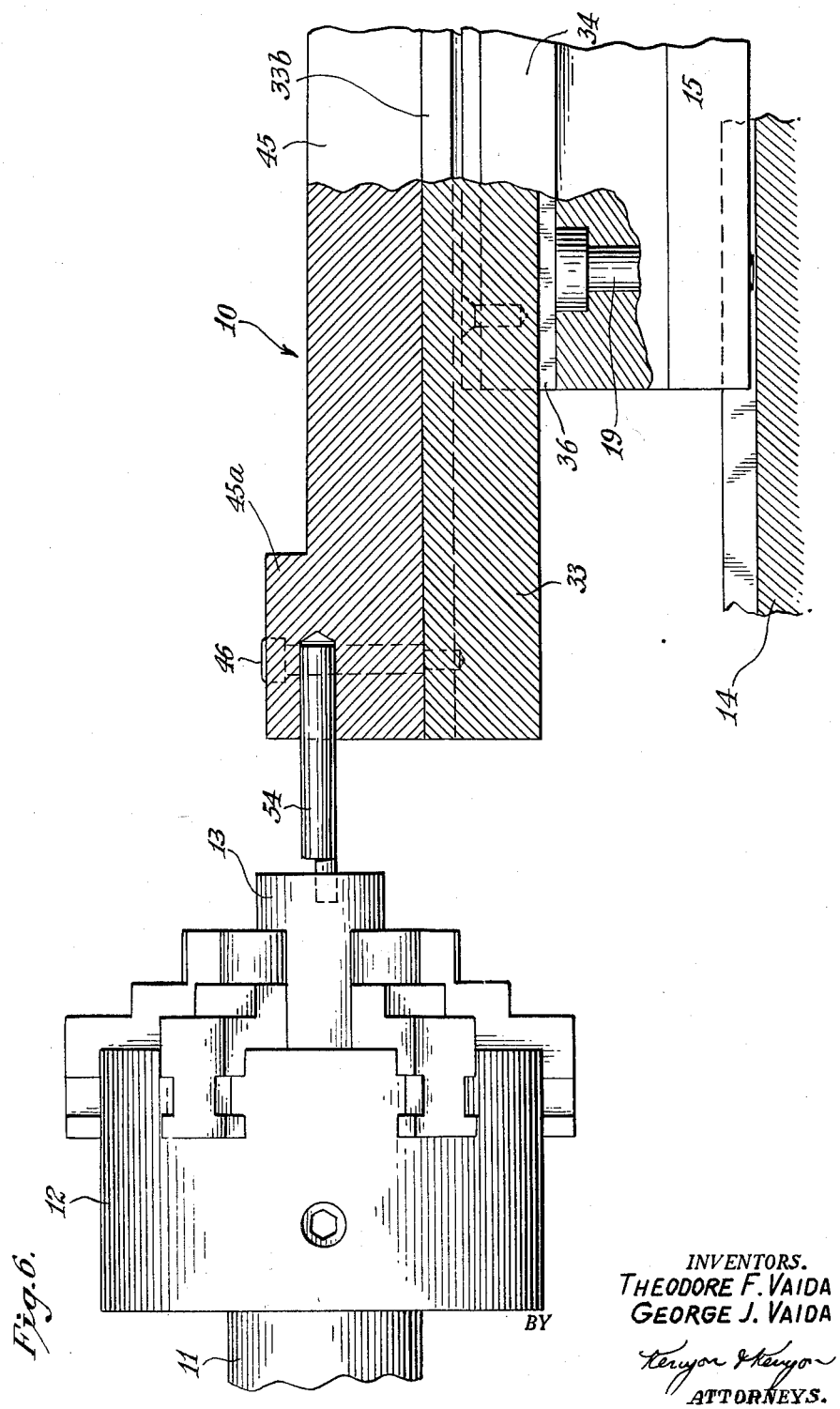

United States Patent Office 2,922,328
Patented Jan. 26, 1960

2,922,328

MACHINE LATHE ATTACHMENT

George J. Vaida and Theodore F. Vaida,
High Bridge, N.J.

Application February 1, 1956, Serial No. 562,787

3 Claims. (Cl. 82—24)

The present invention relates generally to metal working machine tools or lathes, and more particularly to a tool-holding carriage attachment or fixture for a lathe adapted automatically to perform operations on work pieces repetitively and with a high degree of precision.

In the conventional machine lathe arrangement, a work piece is supported for rotation by a spindle and a cutting tool is held on a carriage which is slidable on ways. The carriage is movable longitudinally on the ways to and from the work piece for performing boring, facing and turning operations thereon, as desired. The movement of the carriage may be controlled manually through a hand wheel or it may be power driven through the usual feed screws in accordance with customary practice.

Where the nature of the work involves close tolerances, great care must be exercised by the lathe operation in adjusting the tool on its carriage support and in feeding the tool against the work piece. The slightest degree of play in the carriage structure or in the feeding mechanism therefor will give rise to inaccuracies in the work. Moreover, when the tool is fed by hand or by conventional power means, variations will frequently occur in the rate of feed, as a result of which hill and dale undulations will develop in the surface being machined.

While it is possible for an expert lathe operator to machine a work piece within close tolerances on conventional lathe structures, this task is time-consuming and requires frequent inspection. Furthermore, where repetitive operations are required for production items, readjustments must often be made from piece to piece, thereby further adding to the time and expense involved.

In view of the foregoing, it is the primary object of the invention to provide a carriage attachment for a lathe adapted to perform repetitive operations with a high degree of precision.

More specifically it is an object of the invention to provide a carriage attachment wherein a carriage guideway is supported on a table attachable to the ways of a lathe, and a tool holding block is supported on a carriage slidable in said guideway, the longitudinal advance of the carriage toward a work piece being controlled by hydraulic and air pressure means to perform cutting operation at a uniform rate with extreme accuracy. To expedite repetitive operations, the carriage control means in accordance with the invention are adapted to feed and retract the tool holder relative to the work piece by air pressure at a rapid rate, until such time as the tool is in close proximity to the work piece, at which point the advance of the tool is carefully governed by oil pressure.

Also an object of the invention is to provide a lathe attachment as above described including means separately to effect micro-adjustment of said carriage relative to said carriageway, and said carriageway relative to said table, whereby axial parallelism is mintained therebetween.

A further object of the invention is to provide a pair of perpendicularly arranged lathe attachments adapted automatically to carry out cross-cut and facing operations in successive order.

It is also an object of the invention to provide a lathe attachment of rugged and reliable design. A significant feature of the invention is that by replacing the conventional carriage on a standard lathe with an attachment as herein disclosed, it is possible at relatively low cost to convert the standard lathe to a high precision lathe. Thus, if an inexpensive lathe is available having a good head spindle but a worn carriage and feed mechanism, this lathe cannot only be salvaged by the use of the invention but its operation materially improved to the point where it can carry out the functions heretofore attainable with highly expensive precision lathe structure.

For a better understanding of the invention, as well as other objects and further features thereof, reference is had to the following detailed description to be read in conjunction with the accompanying drawing, wherein like components in the various views are indentified by like reference numerals.

In the drawing:

Figure 1 is a top plan view of a lathe attachment in accordance with the invention.

Figure 2 is a side elevational view of the attachment.

Figure 3 is a front elevational view, partly in section, as seen looking toward the right of the attachment in Fig. 1.

Figure 6 is a sectional view showing the front end of the attachment as it appears when mounted on a lathe.

Figure 4:
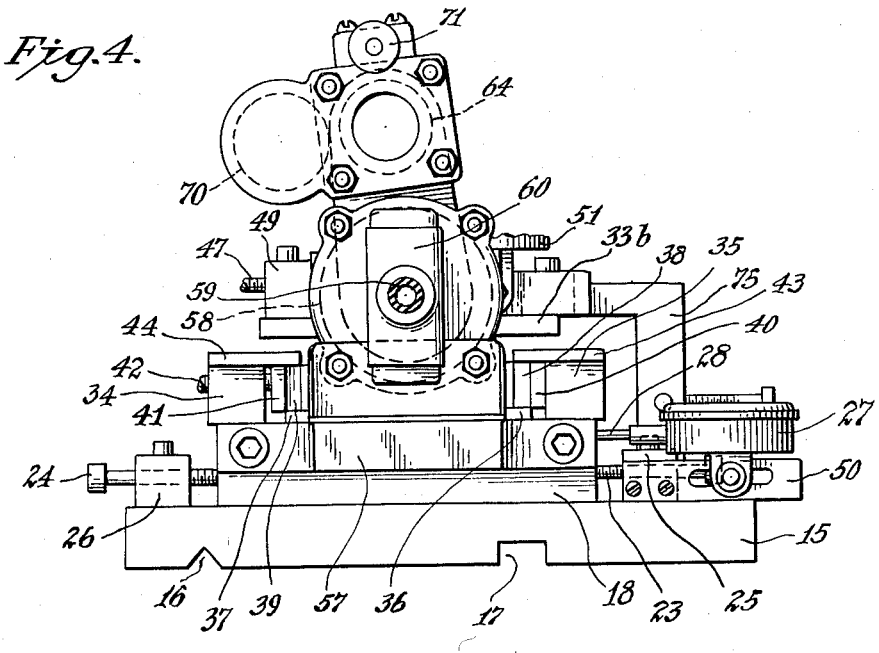
Figure 4 is a rear elevational view, as seen looking toward the left in Fig. 1.
Figure 5:
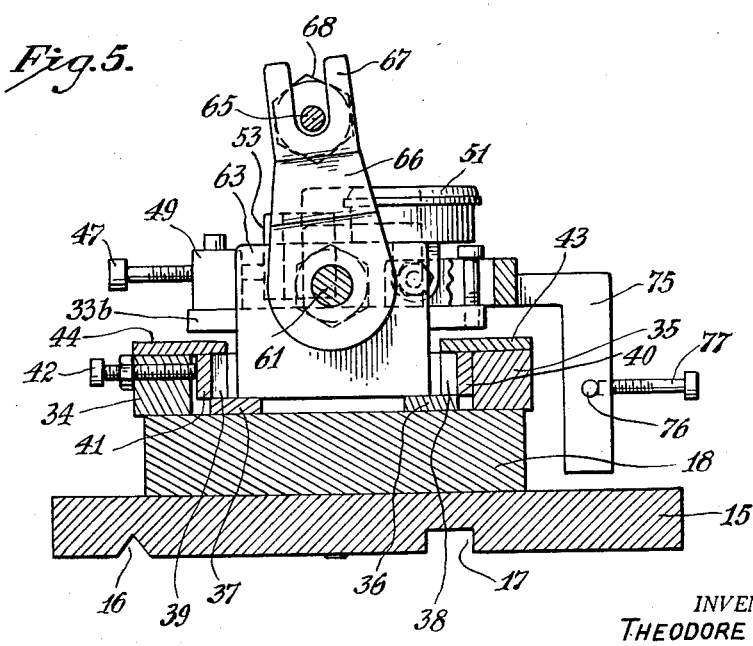
Figure 5 is a sectional view taken along the line 5—5 in Fig. 1.

Referring now to the drawings, and more particularly to Fig. 6, the attachment according to the invention is generally designated by numeral 10 and is mountable on a conventional lathe having the usual driving head in which a spindle 11 is rotatably supported and driven in the customary manner. The spindle 11 carries a chuck 12 in which is secured a work piece 13. The work piece by way of example is shown as a short length of shaft. The bed of the lathe includes a pair of rails or ways 14, only one of which is illustrated.

The attachment which is mountable on the ways includes a base plate or main table 15. As best seen in Fig. 3, table 15 is provided at its under surface with a longitudinally extending groove 16 having an inverted V cross-sectional shape and a second groove 17 parallel thereto having a rectangular cross-sectional shape. The grooves are adapted to accommodate similarly shaped projections on the ways 14 of the lathe whereby the table 15 rests securely thereon. Means (not shown) may be provided to clamp the table firmly to the bed of the lathe to prevent any displacement thereof.

Superposed on main table 15 is an auxiliary table 18 whose longitudinal dimension is equal to that of the main table but whose transverse dimension is smaller. Auxiliary table 18 is pivotally attached to the main table 15 by means of a bolt 19 which extends through the tables at a central point adjacent the front ends thereof. Bolt 19 is provided with a threaded shank 19a which engages a nut 20 received within a recess 21 in the under side of main table 15, rotation of the nut being prevented by a resilient washer 22.

Thus the angular position of the auxiliary table 18 is adjustable relative to the main table about a pivot point 19. As best seen in Fig. 1, this adjustment is controllable by a pair of set screws 23 and 24 threadably mounted on posts 25 and 26 secured to the main table 15 adjacent the rear end thereof. The set screws 23 and 24 engage opposing side edges of the auxiliary table 18 whereby it may be shifted angularly about its pivot 19 in either direction. Attached to post 25 by means of an adjustable bracket 50 (Fig. 4) is a micrometer gauge 27 having a plunger 28 projecting therefrom and engaging the edge wall of auxiliary table 18. Thus the gauge 27 provides an accurate indication of the angular position of the auxiliary table relative to the main table.

In order to maintain a given angular setting of the auxiliary table 18 with respect to the main table 15, two screws 29 and 30 are provided which pass through transverse slots 31 and 32 in the auxiliary table and are threadably received in holes bored in the main table. When the auxiliary table is being adjusted, screws 29 and 30 are loosened to permit the desired angular shift, the screws thereafter being tightened to hold the auxiliary table in its adjusted position. By adjusting screws 42 to urge strip 41 against strip 39, lateral play of the carriage is avoided but the adjustment is such as to permit sliding movement of the carriage.

Slidably mounted on auxiliary table 18 is a carriage 33 having a rectangular base portion 33a and a raised platform portion 33b, the base portion extending longitudinally beyond the platform portion. As best seen in Fig. 3, the carriage is slidable within a guideway formed by two spaced bars 34 and 35 bolted to the auxiliary table and extending longitudinally thereon, the under surface of the carriage riding on raised tracks 36 and 37 bolted to the top surface of auxiliary table 18.

To prevent lateral play of the carriage within the guideway and to provide a uniform and smooth glide surface, the base portion 33a is provided with polished steel strips 38 and 39 secured to the sides thereof. Similar strips 40 and 41 are interposed between strips 38 and 39 and the guideway bars 34 and 35. The pressure of strip 41 against carriage strip 39 is adjustable by means of screws 42 extending through bar 34 and engaging strip 41, thereby controlling the slippage of the carriage. The guideway is completed by narrow plates 43 and 44 mounted on the top surface of bars 34 and 35 and extending over strips 39 and 41 on one side and strips 38 and 40 on the other side, thereby preventing elevational play of the carriage.

Superposed on carriage 33 is a tool holding block 45 having an enlarged head portion 45a, the front edge of the block being in alignment with the front edge of the carriage. Block 45 is pivotally connected to the carriage by means of a pivot pin 46 extending downwardly through a central opening in the head portion 45a, the pin being threadably received in a bore in the carriage. Thus the angular position of the block 45 is adjustable relative to the carriage 33, this adjustment being effected by means of set screws 46 and 47 extending through posts 48 and 49 mounted on the carriage platform 33b adjacent the rear end thereof. Set screws 46 and 47 impinge against the sides of the tool holding block 45, so that by relative adjustment of the screws the block may be angularly displaced to assume a desired position. To indicate the position of the block 45, a micrometer gauge 51 calibrated in degrees is mounted on carriage 33 to one side adjacent the rear end thereof, the gauge including a plunger 52 which engages the arm of a bracket 53 attached to the rear end of the tool holder 45 and extending rearwardly therefrom. Thus the gauge affords a reading indicative of the angular position of the tool holder with respect to the carriage. To maintain the adjusted position of the tool holder 45 on the carriage platform 33b, a set screw 80 is provided which passes through a transverse slit 81 in the tool holder and is threadably received in the carriage platform. A cutting tool 54 is received within a socket in the head 45a of the tool holder and projects forwardly thereof.

It will be evident from the foregoing that a relatively large lateral displacement of the rear portion of the auxiliary table 18 by means of set screws 23 and 24 produces a relatively small angular shift in the position of this auxiliary table with respect to the main table 15. Similarly a relatively large lateral displacement of the rear portion of the tool holder block 45 produced a relatively small angular shift of this block with respect to the carriage 33. This makes possible a fine and precise angular adjustment of these elements within micro limits.

As best seen in Fig. 2, for the purpose of advancing or retracting the slidable carriage 33 longitudinally on the auxiliary table 18, a hydraulic drive mechanism generally designated by numeral 56 is provided. Mechanism 56 is mounted on a bed plate 57 bolted to and extending from the rear end of the auxiliary table 18. The drive mechanism includes a lower air cylinder 58 to which is connected a pressurized air source (not shown) via inlet 59 and a solenoid-operated control valve 60 of any conventional design. Extending axially from the air cylinder 58 is a piston rod 61 which is coupled to a drive rod 62 connected to an upright member 63 attached to the rear end of carriage 33.

Thus when valve 60 is actuated to feed air into cylinder 58 in a direction advancing piston rod 62, the carriage 33 is urged to slide forward, thereby advancing the tool toward the work piece. When, however, the valve action is reversed, the piston rod is retracted into the air cylinder and the tool is withdrawn. The solenoid actuated valve is electrically operated by conventional switching means (not shown) which may be mounted adjacent the attachment or at any other convenient position.

A loose or floating coupling is preferably provided between upright 63 and drive rod 62 so that if the drive rod is off axis to any extent, no lateral forces will be applied to the carriage coupled thereto. Thus the loose coupling makes allowance for misalignment between the air cylinder and the carriage.

The air cylinder 58 acts to drive the carriage in either direction at a relatively rapid rate. However, by reason of the compressible characteristics of air, means are necessary to regulate and stabilize the movement of the drive rod when the cutting tool engages the work piece, so that the cutting operation takes place at a uniform rate. For this purpose an oil cylinder 64 is provided which is mounted above the air cylinder and includes a threaded piston rod 65 extending axially therefrom. The piston rod 61 of the air cylinder is coupled to the piston rod 65 of the oil cylinder by means of a yoke member 66 attached to rod 61 and having an upper fork portion 67 between whose fingers the rod 65 extends. Threadably received on rod 65 is a stop nut 68 which engages the fork at a forward point determined by the adjusted position of the nut.

Thus, when the fork engages the stop, the advance of air piston rod 61 tends simultaneously to advance the oil piston rod 65. The forward movement of the oil piston rod forces oil from oil cylinder 64 through a pipe 69 into an oil reservoir 70, the rate of oil flow being controlled by a needle valve 71. As a result, the oil system resists the forward movement of the air piston rod to an extent determined by the adjustment of the needle valve 71, and since the oil is non-compressible and the flow thereof is regulated, the advance of the air piston rod 61 after the yoke 67 has engaged stop nut 68 is governed by the oil flow to stabilize the rate of advance.

The position of stop nut 68 is adjusted so that the action of the oil cylinder takes effect just before the tool 54 proceeds to cut. When the tool is retracted by reversing the direction of air flow in air cylinder 58, the yoke 67 serves to reinsert the oil piston rod 65 into the oil cylinder 64 when it engages a second stop 72. The insertion of the piston rod 65 into the oil cylinder draws oil from the reservoir 70 back into the cylinder.

The depth of cutting is automatically controlled by means of a cut-off switch 73 (note Fig. 1) mounted on the main table 15 on one side thereof adjacent the front end, the cut-off switch having an actuating pin 74. Attached to carriage 33 and extending laterally therefrom is a supporting arm 75 and extending perpendicularly from the arm is an actuator rod 76 in axial alignment with pin 74 on switch 73. The axial position of rod 76 is adjustable by means including set screw 77.

The arrangement is such that when rod 76 strikes pin 74 to actuate switch 73, the switch serves to operate solenoid valve 60 of the drive mechanism to reverse the movement of the carriage. The rod 76 may be adjusted so that the reversal and retraction of the carriage takes place instantly at a desired depth of cutting.

An attachment similar to that shown in the figures may be mounted on lathe ways transversely disposed relative to the work piece for performing cross-cut and facing operations. These operations may be made to occur upon completion of boring operations by arranging switch 73 on the longitudinal attachment to switch on the transverse attachment for forward operation at the moment the longitudinal carriage is caused to retract.

While theer has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A tool holding carriage attachment for a lathe provided with carriage ways, said attachment comprising a main table mountable on said ways, an auxiliary table pivotally mounted atop said main table, means to adjust the angular position of said auxiliary table relative to said main table, a carriage slidably mounted for longitudinal movement on said auxiliary table, a drive mechanism secured to said auxiliary table and coupled to said carriage for advancing and retracting same, a tool holding block pivotally mounted atop said carriage, and means to adjust the angular position of said block relative to said carriage, said drive mechanism including an air cylinder having a piston movable therein and a piston rod connected thereto, said rod being coupled to said carriage to move same in a direction depending on the direction of air pressure applied to said piston, an oil cylinder having a piston movable therein and a rod connected thereto, said air piston having a fork member secured thereto adapted to engage a first stop on said oil piston at a predetermined position thereon upon the forward movement of said air piston and to engage a second stop of said oil piston upon return movement of said air piston, and an oil reservoir coupled to said oil cylinder.

2. A tool holding carriage attachment for a lathe having a rotatable spindle for turning a work piece and provided with carriage ways, said attachment comprising a main table mountable on said ways, an auxiliary table pivotally mounted on top of said main table, means to adjust the angular position of said auxiliary table relative to said main table, a carriage slidably mounted for longitudinal movement on said auxiliary table, a drive mechanism secured to said auxiliary table and coupled to said carriage for advancing and retracting same, a tool holder block pivotally mounted on top of said carriage, and means to adjust the angular position of said block relative to said carriage.

3. A tool holding carriage attachment for a lathe having a rotatable spindle for turning a work piece and provided with carriage ways, said attachment comprising a main table mountable on said ways, an auxiliary table pivotally mounted on top of said main table, a pair of set screws on either side of said auxiliary table and mounted on said main table to adjust the angular position of said auxiliary table, a carriage slidably mounted for longitudinal movement on said auxiliary table, a drive mechanism secured to said auxiliary table and coupled to said carriage for advancing and retracting same, a tool holding block pivotally mounted on top of said carriage, and a second pair of set screws on either side of said block and mounted on said carriage to adjust the angular position of said block.

References Cited in the file of this patent

UNITED STATES PATENTS

| Number | Name | Date |
|---|---|---|
| 319,618 | Pratt | June 9, 1885 |
| 527,213 | McClellan | Oct. 9, 1894 |
| 2,065,933 | Blanchard | Dec. 29, 1936 |
| 2,308,099 | Obecny | Jan. 12, 1943 |
| 2,553,984 | Siekmann | May 22, 1951 |
| 2,563,918 | Casella | Aug. 14, 1951 |
| 2,604,000 | Kjellberg | July 22, 1952 |
| 2,701,429 | Hartridge | Feb. 8, 1955 |
| 2,715,389 | Johnson | Aug. 16, 1955 |
| 2,807,176 | Butcher et al. | Sept. 24, 1957 |